Patented Jan. 19, 1926.

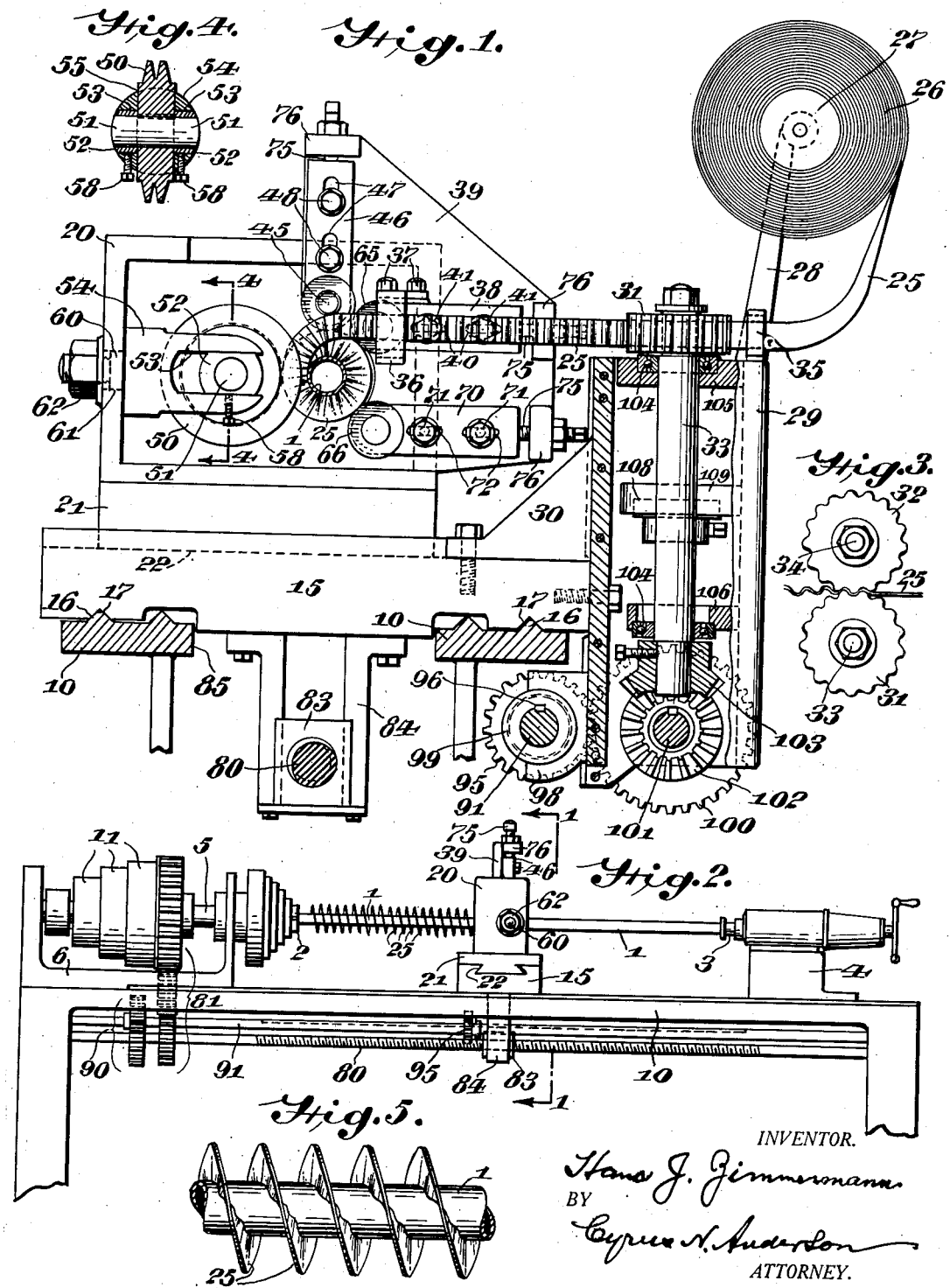

1,570,117

UNITED STATES PATENT OFFICE.

HANS J. ZIMMERMANN, OF MANNHEIM, GERMANY, ASSIGNOR TO SCHUTTE AND KOERTING COMPANY, OF PHILADELPHIA, PENNSYLVANIA, A CORPORATION OF PENNSYLVANIA.

APPARATUS FOR APPLYING HELICAL RIBS TO PIPES.

Application filed December 30, 1922. Serial No. 609,797.

*To all whom it may concern:*

Be it known that I, HANS J. ZIMMERMANN, a citizen of Germany, and a resident of Mannheim, in the Province of Baden, Germany, have invented an Improvement in Apparatus for Applying Helical Ribs to Pipes, of which the following is a specification.

My invention relates to improvements in apparatus for applying helical ribs to pipes, and it has for its general object to provide a novel method and apparatus by means of which fins may be applied to or formed upon pipes by coiling thin sheet metal strips edgewise and helically thereon.

A further object of the invention is to provide an improved novel method of applying fins helically to pipes which consists in first corrugating thin narrow strips of sheet metal and thereafter coiling the same edgewise and helically about pipes so as to stretch out or remove the corrugations at the outer circumferential edge portion thereof but without removing the corrugations at the inner edge portion thereof; and a still further object is to provide an improved and novel construction of apparatus for the practising of the said method.

Other objects and advantages of my invention will be pointed out in the detailed description thereof which follows or will be apparent from such description.

In order that the invention may be understood more readily and its practical advantages fully appreciated, reference may be had to the accompanying drawing in which I have illustrated one example of an apparatus embodying my invention and by means of which the improved and novel method may be carried out or practised. It will be understood that modifications in the mechanical details of construction of the apparatus shown may be made within the scope of the claims without departing from my invention.

In the drawing:

Fig. 1 is a transverse sectional view, enlarged, taken on the line 1—1 of Fig. 2, of an apparatus embodying by invention, portions of the structure being broken away in order that other portions thereof may be more clearly shown;

Fig. 2 is a view in side elevation of the apparatus and of the upper portion of the table supporting the same;

Fig. 3 is a top plan view of a pair of toothed rollers by means of which the narrow strips or bands to be coiled around pipes are corrugated;

Fig. 4 is a transverse sectional view taken on the line 4—4 of Fig. 1; and

Fig. 5 is an enlarged view of a portion of pipe with a helical rib thereon applied in accordance with my invention.

Referring to the drawing: 1 designates a pipe about which a thin narrow strip of sheet metal is adapted to be wound edgewise and helically to form a helical fin thereon. The said pipe is supported at one end in the chuck 2 of a lathe and at its opposite end upon a support 3, of known construction, which is adjustable and rotatable. The adjustable supporting means 3 is supported upon a tail stock 4. The chuck 2 is supported upon a rotatable shaft 5 mounted in bearings in a bracket 6 supported upon a table 10. The tail stock 4 is also supported upon the table 10. The shaft 5 is adapted to be rotated to effect rotation of the chuck 2 and of the pipe 1 held thereby by means of drive wheels 11 of different diameters. The arrangement and operation of these drive wheels are well known.

I shall now refer to and describe the mechanism for corrugating and for feeding or supplying the strip or band of thin sheet metal to the said pipe and for guiding and holding the same with respect thereto. The said mechanism comprises a base 15 which is slidably mounted upon the table 10 and is held against lateral displacement thereon by the angular ribs 16 which engage correspondingly shaped grooves 17 in the base 15. A rectangular shaped frame-like member 20 is secured to a member 21 which has a tongue and groove connection, as indicated at 22, with the base 15. Such connection enables removal of the frame 20, with the parts carried thereby, from the base 15, if desired.

The thin, narrow sheet metal strip or band 25 to be coiled helically about the pipe 1 is supported in a roll, as indicated at 26, upon a drum 27 supported upon brackets 28 which extend upwardly from a housing 29, which housing is secured to the base 15 and to a bracket 30 secured to said base and is supported thereby. The strip 25 passes between two intermeshing, toothed wheels 31 and 32 supported upon shafts 33 and 34 and is thereby corrugated. The means for supporting and effecting rotation of the shafts will be hereinafter described. In passing between the toothed wheels 31 and 32 the strip or band 25 is corrugated or converted into sinuous form. The teeth of these wheels are shaped so as to provide corrugations of the depth and width desired. The said wheels in the construction shown are cylindrical so that the corrugations of the strip or band 25 extend uniformly over the whole width thereof. If desired the said strip may pass through a guide 35 adjacent the said wheels 31 and 32. The strip may also pass through a second guide at 36 which is secured by means of screw threaded bolts 37 to the upper side of a block or bar 38 which is adapted to be adjustably secured to the frame 20 and an angular flange-like plate 39 secured thereto and projecting upwardly and to the right (having reference to Fig. 1) as shown. The said bar or block is provided with slots 40 through which screw threaded bolts 41 extend, the inner ends of which bolts have screw threaded engagement with the parts 20 and 39. By loosening these bolts the bar 38 may be adjusted to the position desired and held in such position by clamping the heads of the said bolts 41 against the outer side thereof.

For the purpose of guiding the said corrugated strip or band as it approaches the pipe 1 at a point approximately where the outer edge of the bend of said strip merges with the straight top edge portion thereof, I have provided a roller 45 which is adapted to engage the upper edge of the said strip or band as shown in Fig. 1. The said roller is supported upon the lower end of a bar 46 having slots 47 therein through which screw threaded bolts 48 extend, which bolts have screw threaded engagement with the frame 20 and the upwardly extending portion of the flange-like part 39. By loosening the bolts 48 the bar 46 may be adjusted to the position desired. As the corrugated forward end portion of the strip or band 25 is bent or coiled around the pipe 1 the outer peripheral portion thereof enters a groove of V-shape in the periphery of a roller 50. This roller is provided with trunnions 51 which are journaled in blocks 52 which are supported in slots 53 in the opposite sides of a supporting arm or projection 54 mounted upon the forward side of the rectangular shaped frame structure 20.

The roller 50 is situated partially within a slot 55 provided in the inner end portion of the supporting arm or projection 54. The blocks 52 may be held in any position to which they may be adjusted within the slots 53 in the opposite side portions of the arm or projection 54 by means of binding screws or bolts 58. The outer end of the arm or projection 54 is provided with a lug or projection 60 which extends through an opening 61 in the forward side of the frame 20. The outer end of the said lug or projection is screw threaded and is engaged by a nut 62 which is adapted to bind against the outer surface of the front side of the frame 20 so as to hold the arm or projection 54 in place in any position to which it may be adjusted about its axis. It is necessary that the grooved roller 50 shall occupy a plane corresponding to the plane of the pitch of the coil of the strip or band 25 about the pipe 1. For the purpose of holding the pipe 1 against lateral displacement by bending, I have provided the rollers 65 and 66 which engage the periphery of the coil of the strip which is immediately in rear of the coil being formed. These rollers are not grooved and it is not necessary that they should be, but either or both of them may be if desired. The roller 65 is supported upon the bar 38 previously referred to. The roller 66 is supported upon a bar 70 which is adjustably secured to the frame 20 and the angular flange-like plate 39 by means of screw threaded bolts 71 which extend through slots 72 in the said bar and engage at their inner screw threaded ends with the said frame 20 and the flange-like plate portion 39. For the purpose of preventing outward movement of the bars 38, 46 and 70 after they have been adjusted to the position desired, the stops 75 are provided which have screw threaded engagement with lugs 76 upon the flange-like plate 39. These stops have screw threaded engagement with the lugs or projections 76 and may be adjusted as desired.

It will be noted that the rollers 50, 65 and 66 are triangularly related to each other and that their relation to each other is such that the pipe 1 is prevented from bending under the strain or pressure which is imposed upon it by bending of the strip or band around the same.

In order to spirally wind or coil the strip or band 25 about the pipe 1 to form a helix it is necessary that as the said strip or band is fed to the said pipe the means for accomplishing such feeding shall be moved along the said pipe longitudinally thereof. Such movement of this mechanism is effected by means of a screw threaded rod or shaft 80 the opposite ends of which are rotatably supported in the opposite legs which support the table 10. Rotation of the said rod or shaft is effected by means of a train of gears indicated as a whole at 81. One of these gears is mounted upon the shaft 5 previously referred to and upon rotating the latter the said train of gears is operated to effect rotation of the shaft 80. This shaft is in screw threaded engagement with a nut 83 supported upon brackets 84 which depend from the bottom side of the base 15 through an opening 85 which extends longitudinally of the table 10. Rotation of the said rod or shaft 80 causes movement of the nut 83 in one direction or the other thereon, depending upon the direction of rotation of the said rod or shaft, and the said nut, being connected with the base 15 which carries the frame 20 and the parts supported thereon, causes corresponding movement of the said parts together with the strip which is supported upon the drum 27.

In order to effect corrugation of the strip or band 25 it is necessary that the wheels 31 and 32 shall be rotated. To effect rotation of these wheels I have provided a train of gears as indicated at 90, one of which gears is secured to the rod or shaft 80 and another one to a shaft 91 journaled at its opposite ends in the legs of the table 10. Rotation of the rod or shaft 80 effects rotation of the shaft 91 through the said train of gears 90. The shaft 91 is provided with a gear 95 which is adapted to slide thereon and which is caused to rotate therewith by means of a key 96. Longitudinal or sliding movement of the gear 95 upon the shaft 91 is caused by means of a projection 98 which extends inwardly from the lower end portion of the inside wall of the housing 29 and engages an annular groove in a collar 99 secured to the said gear. The gear 95 is in engagement with a gear 100 which is supported upon one end of a shaft 101 journaled in the opposite side walls of the housing 29. Mounted upon the shaft 101 is a bevel gear 102 which is in engagement with a bevel gear 103 secured to the lower end of the shaft 33 mounted in ball bearings 104 which in turn are supported upon brackets 105 and 106 which project outwardly from the inner wall of the housing 29. The shaft 34 which is situated back of the shaft 33 (having reference to Fig. 1) is supported at its upper end in a ball bearing, not shown, supported upon the bracket 105 and at its lower end in a ball bearing at 108 supported upon a bracket 109 which extends outwardly from the central portion of the inner wall of the housing 29.

It will be apparent that upon rotation of the shaft 5 as hereinbefore described, rotation of the rod or shaft 80 is caused and that such rotation causes longitudinal movement of the base 15 and the parts connected therewith in parallel relation to the pipe 1; and also that rotation of the rod or shaft 80 through the train of gears 90 causes rotation of the shaft 91 which, through the gears 95, 100, 102 and 103, causes rotation of the shaft 33 which carries the wheel 31. The teeth or projections of the latter intermesh with the corresponding teeth or projections upon the wheel 32 and effect like rotation thereof together with the shaft 34 to which it is secured.

The speed of rotation of the rod or shaft 80 depends upon the ratio of the gears in the train of gears 81 to each other and by varying this ratio by the changing or substitution of gears the speed of rotation of the said rod or shaft 80 may likewise be varied. Variation of the speed of rotation of the shaft 80 causes variation in the speed of movement of the base 15 with the parts carried thereby, which will cause a variation in the pitch of the helix formed by bending or coiling the strip or band 25 around the pipe 1.

The relation of the speeds of rotation of the pipe 1 at its circumference and of the wheels 31 and 32 at their circumferences should be such that the strip or band 25 between the pipe 1 and the said wheels 31 and 32 is held taut or tensioned so that as it is coiled around the pipe 1 its inner edge will grip and hug the same tightly and make a tight joint therewith.

In the operation of the apparatus and in the practising of the method embodying my invention the means for corrugating and supplying the corrugated strip or band to the pipe in tangential relation thereto is moved into position adjacent an end of the pipe. In the construction as shown such means is moved into position adjacent the end of the pipe which is held by the chuck 2. The inner edge of the forward end portion of the strip is secured to the pipe at such end in any suitable manner as by welding, soldering, brazing, or otherwise. After this has been done the pipe is rotated in the manner as hereinbefore described and in the direction as indicated by the arrow associated therewith in Fig. 1 of the drawing. Such rotation of the pipe effects coiling of the strip or band about the said pipe, and as the said strip or band is fed along the pipe length-wise thereof a helical coil or helix is produced or formed about the same. When the mechanism for supplying the strip or band to the pipe has reached the opposite end thereof it is stopped, the strip or band is severed, and the rear end thereof secured to the adjacent end of the pipe by soldering, welding, brazing or otherwise, as was done with respect to the forward or front end thereof.

As described, the forward end portion of the strip or band as it approaches the pipe is guided by the contact of its upper or outer edge above the pipe with the under side of the roller 45 and as the strip or band is wound or coiled on to the pipe its outer peripheral edge portion is stretched substantially into smooth or flat form, as is indicated in Fig. 4 of the drawing. The outer circumferential edge portion of the strip or band, as it is bent or coiled about the pipe 1, enters the narrow groove within the roller 50, the opposite side walls of which operate to flatten and smooth the said outer circumferential edge portion of the coil, but leave the inner edge portion thereof corrugated as shown. The arm 54 may be adjusted about its axis as is necessary to bring the plane of the peripheral groove of the roller 50 into co-incidence with the plane of the portion of the coil or helix with which it is in engagement. This plane varies with the pitch of the helix.

As heretofore described, the inner edge of the band is caused to hug tightly against the outer surface of the pipe so that it is in rigid engagement therewith, in consequence of which it is necessary to secure the said strip or band to the pipe at the opposite ends of the latter only. The strip or band, intermediate its ends, is in close rigid contact with the pipe so that the heat is uniformly transmitted over the whole length of the pipe and the coiled strip or band is not displaced on the pipe even though subjected to high temperature.

Having thus described my invention, what I claim and desire to secure by Letters Patent is:

1. In an apparatus for coiling bands on pipes, the combination, with a rotary pipe support, of means for corrugating a band from edge to edge, means for feeding said band to a pipe mounted on said support, and means for stretching the outer edge portion of said band to remove the corrugations therefrom as it is wound upon said pipe.

2. In an apparatus for coiling bands on pipes, in combination, a pipe support, means for causing rotation of said pipe support, and means for feeding a corrugated band to and tangentially of a pipe mounted on said support at a speed less than the speed of rotation of the circumferential surface of the said pipe.

3. In an apparatus for coiling bands on pipes, the combination, with a rotary pipe support, of means for bending a band from edge to edge into wave-like form and feeding the same to and tangentially of a pipe mounted on said support, which band is adapted to be coiled upon said pipe, and means for engaging the periphery of a coil adjacent the coil being formed to prevent bending of said pipe.

4. In an apparatus for coiling bands on pipes, the combination, with a rotary pipe support, of means for forming a band with transverse waves extending uniformly over the whole breadth thereof and for feeding the same to and tangentially of a pipe mounted on said support, and mechanism intermediate said rotary pipe support and said means for causing traveling movement of the latter longitudinally of said pipe.

5. In an apparatus for coiling bands on pipes, the combination, with a rotary pipe support, of means for corrugating a band transversely of its length and feeding the same to a pipe mounted on said support, the forward end portion of the inner edge of said band being connected to said pipe whereby rotation of the latter causes the coiling of the former about said pipe, a guide roller between said bending means and pipe support in position for guiding the band being fed to the pipe, and a smoothing roller located in position for smoothing the outer edge portion of said band simultaneously with the coiling of the same edgewise on the said pipe.

In testimony that I claim the foregoing as my invention, I have hereunto signed my name this 14th day of November, A. D., 1922.

HANS J. ZIMMERMANN.